US 8,201,025 B2

(12) United States Patent
Moyer et al.

(10) Patent No.: US 8,201,025 B2
(45) Date of Patent: Jun. 12, 2012

(54) DEBUG MESSAGING WITH SELECTIVE TIMESTAMP CONTROL

(75) Inventors: William C. Moyer, Dripping Springs, TX (US); Richard G. Collins, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 183 days.

(21) Appl. No.: 12/432,241

(22) Filed: Apr. 29, 2009

(65) Prior Publication Data

US 2010/0281304 A1 Nov. 4, 2010

(51) Int. Cl.
*G06F 11/00* (2006.01)

(52) U.S. Cl. ............................ 714/45; 714/30; 714/37

(58) Field of Classification Search .................... 714/25, 714/30, 37, 45
See application file for complete search history.

(56) References Cited

U.S. PATENT DOCUMENTS

| | | | |
|---|---|---|---|
| 6,145,122 A | 11/2000 | Miller et al. | |
| 6,615,370 B1 | 9/2003 | Edwards et al. | |
| 6,665,816 B1 | 12/2003 | Edwards et al. | |
| 6,732,307 B1 | 5/2004 | Edwards | |
| 6,779,145 B1 | 8/2004 | Edwards et al. | |
| 6,918,065 B1 | 7/2005 | Edwards et al. | |
| 6,941,482 B2* | 9/2005 | Strong | 714/45 |
| 7,031,869 B2* | 4/2006 | Litt et al. | 702/125 |
| 7,346,476 B2 | 3/2008 | Levine et al. | |
| 2002/0188888 A1* | 12/2002 | Rivoir | 714/25 |
| 2003/0145255 A1 | 7/2003 | Harty et al. | |
| 2005/0138484 A1 | 6/2005 | Moyer et al. | |
| 2005/0276385 A1 | 12/2005 | McCormick et al. | |
| 2007/0089085 A1 | 4/2007 | Atkin et al. | |
| 2007/0089095 A1 | 4/2007 | Thekkath et al. | |
| 2007/0168968 A1 | 7/2007 | Bates et al. | |
| 2007/0174707 A1 | 7/2007 | Sarkar et al. | |
| 2008/0162272 A1 | 7/2008 | Huang et al. | |
| 2008/0201615 A1* | 8/2008 | Bottemiller et al. | 714/45 |
| 2009/0125756 A1* | 5/2009 | Swaine et al. | 714/45 |
| 2010/0268990 A1 | 10/2010 | Xu et al. | |

OTHER PUBLICATIONS

IEEE-ISTO 5001-2001, "The Nexus 5001 Forum(tm) Standard for a Global Embedded Processor Debug Interface", Version 2.0, Dec. 23, 2003.*
U.S. Appl. No. 12/389,153, filed Feb. 19, 2009.
U.S. Appl. No. 12/389,156, filed Feb. 19, 2009.
U.S. Appl. No. 12/432,296, filed Apr. 29, 2009.
Office Action mailed Feb. 9, 2011 in U.S. Appl. No. 12/432,296.

* cited by examiner

*Primary Examiner* — Robert Beausoliel, Jr.
*Assistant Examiner* — Joseph D Manoskey
(74) *Attorney, Agent, or Firm* — Joanna G. Chiu; Robert L. King (57) ABSTRACT

A data processing system having debug message generation uses processor circuitry to perform a plurality of processor operations. Global control circuitry is coupled to the processor circuitry. Debug circuitry is coupled to the global control circuitry for generating debug messages corresponding to predetermined processor operations. Message generation logic provides debug messages which selectively include a timestamp field providing information as to when a debug message is generated. Debug control circuitry is coupled to the global control circuitry and the message generation logic and has a timestamp control register. For each of a plurality of debug message types, the timestamp control register selectively enables or disables appending a timestamp to the debug message for that type of debug message. Enable logic is coupled to the timestamp control register for enabling or disabling the timestamp control register based on detecting a selected event in the data processing system.

12 Claims, 7 Drawing Sheets

FIG. 2

FIG. 6
-PRIOR ART-
PROGRAM CORRELATION MESSAGE WITH HISTORY DELIMITATION

FIG. 7
PROGRAM TRACE INDIRECT BRANCH MESSAGE (TRADITIONAL MODE)

FIG. 8
PROGRAM TRACE INDIRECT BRANCH MESSAGE (HISTORY MODE)

| BITS | NAME | DESCRIPTION |
|---|---|---|
| 31 | EN | ENABLED<br>0 - TIMESTAMP CONTROL USING THIS REGISTER IS DISABLED<br>1 - TIMESTAMP CONTROL USING THIS REGISTER IS ENABLED |
| 30:28 | — | RESERVED FOR FUTURE FUNCTIONALITY (READ AS 0) |
| 27:24 | WPSC | WATCHPOINT SOURCE - START CONTROL<br>0000 - WATCHPOINT START CONTROL FOR THIS REGISTER IS DISABLED<br>0001 - USE WATCHPOINT #0 TO ENABLE THIS REGISTER (SET EN TO 1)<br>0010 - USE WATCHPOINT #1 TO ENABLE THIS REGISTER (SET EN TO 1)<br>...<br>1110 - USE WATCHPOINT #13 TO ENABLE THIS REGISTER (SET EN TO 1)<br>1111 - USE SELECTED SYSTEM EVENT |
| 23:20 | WPEC | WATCHPOINT SOURCE - END CONTROL<br>0000 - WATCHPOINT STOP CONTROL FOR THIS REGISTER IS DISABLED<br>0001 - USE WATCHPOINT #0 TO DISABLE THIS REGISTER (CLEAR EN TO 0)<br>0010 - USE WATCHPOINT #1 TO DISABLE THIS REGISTER (CLEAR EN TO 0)<br>...<br>1110 - USE WATCHPOINT #13 TO DISABLE THIS REGISTER (CLEAR EN TO 0)<br>1111 - USE SELECTED SYSTEM EVENT |

FIG. 12

| BITS | NAME | DESCRIPTION |
|---|---|---|
| 19:4 | MTC | MESSAGE TIMESTAMP CONTROL<br>0000000000000000 - MESSAGE TIMESTAMP DISABLED<br>XXXXXXXXXXXXXXX1 - ENABLE TIMESTAMP FOR DEBUG STATUS MESSAGES<br>XXXXXXXXXXXXXX1X - ENABLE TIMESTAMP FOR ERROR STATUS MESSAGES<br>XXXXXXXXXXXXX1XX - ENABLE TIMESTAMP FOR RESOURCE FULL MESSAGES<br>XXXXXXXXXXXX1XXX - ENABLE TIMESTAMP FOR DIRECT BRANCH MESSAGES<br>XXXXXXXXXXX1XXXX - ENABLE TIMESTAMP FOR INDIRECT BRANCH MESSAGES<br>XXXXXXXXXX1XXXXX - ENABLE TIMESTAMP FOR DIRECT BRANCH WITH SYNC MESSAGES<br>XXXXXXXXX1XXXXXX - ENABLE TIMESTAMP FOR INDIRECT BRANCH WITH SYNC MESSAGES<br>XXXXXXXX1XXXXXXX - ENABLE TIMESTAMP FOR DATA READ MESSAGES<br>XXXXXXX1XXXXXXXX - ENABLE TIMESTAMP FOR DATA WRITE MESSAGES<br>XXXXXX1XXXXXXXXX - ENABLE TIMESTAMP FOR DATA READ WITH SYNC MESSAGES<br>XXXXX1XXXXXXXXXX - ENABLE TIMESTAMP FOR DATA WRITE WITH SYNC MESSAGES<br>XXXX1XXXXXXXXXXX - ENABLE TIMESTAMP FOR OWNERSHIP TRACE MESSAGES<br>XXX1XXXXXXXXXXXX - ENABLE TIMESTAMP FOR PROGRAM CORRELATION, TYPE 1 MESSAGES<br>XX1XXXXXXXXXXXXX - ENABLE TIMESTAMP FOR PROGRAM CORRELATION, TYPE 2 MESSAGES<br>X1XXXXXXXXXXXXXX - ENABLE TIMESTAMP FOR PROGRAM CORRELATION, TYPE 3 MESSAGES<br>1XXXXXXXXXXXXXXX - ENABLE TIMESTAMP FOR PROGRAM CORRELATION, TYPE 4 MESSAGES |

FIG. 13

DEBUG MESSAGING WITH SELECTIVE TIMESTAMP CONTROL

BACKGROUND

1. Field

This disclosure relates generally to semiconductors, and more specifically, to data processing systems that implement debug messaging with selective timestamp control.

2. Related Art

An IEEE standard known as IEEE ISTO5001, or the Nexus debug standard, is an established real-time debug standard that supports real-time debug message generation. The Nexus debug standard specifies a mechanism for identifying to an external trace reconstruction tool a predetermined operating condition within the system. Debugging processes are also used in the development of code for a data processing system. Providing debug information in real-time, without intrusion on the normal operation of the data processing system is highly desirable to remain transparent to operation of the system.

Debug messages are generated by the data processing system that contain address and data information for either program events (program trace messaging), or data events (data read messaging, data write messaging), as well as other debug information. These debug messages contain timestamping information as part of the message format. This timestamping information allows a user to examine the relationship of various events generated by one or more processors or other devices in the system to allow for debugging of more complex issues.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

One embodiment provides selective control over timestamping of certain type or classes of debug messages. In one embodiment, a timestamp control register is used to indicate for which debug message types timestamping is enabled. Therefore, based on a type of a generated debug message, the information in the timestamp control register may be used to determine whether or not to append a timestamp to the debug message. Furthermore, in one embodiment, the timestamp control register can be made active by one or more predetermined watchpoint events or system events. Timestamping of messages adds additional bandwidth requirements for exporting the debug messages, since additional information (the timestamp value) is transmitted for each timestamped message. Therefore, by utilizing selective control over timestamping for debug messages, bandwidth required for debug messaging may be conserved since, in many systems, limited bandwidth for externally exporting trace information is available.

Figure 1:
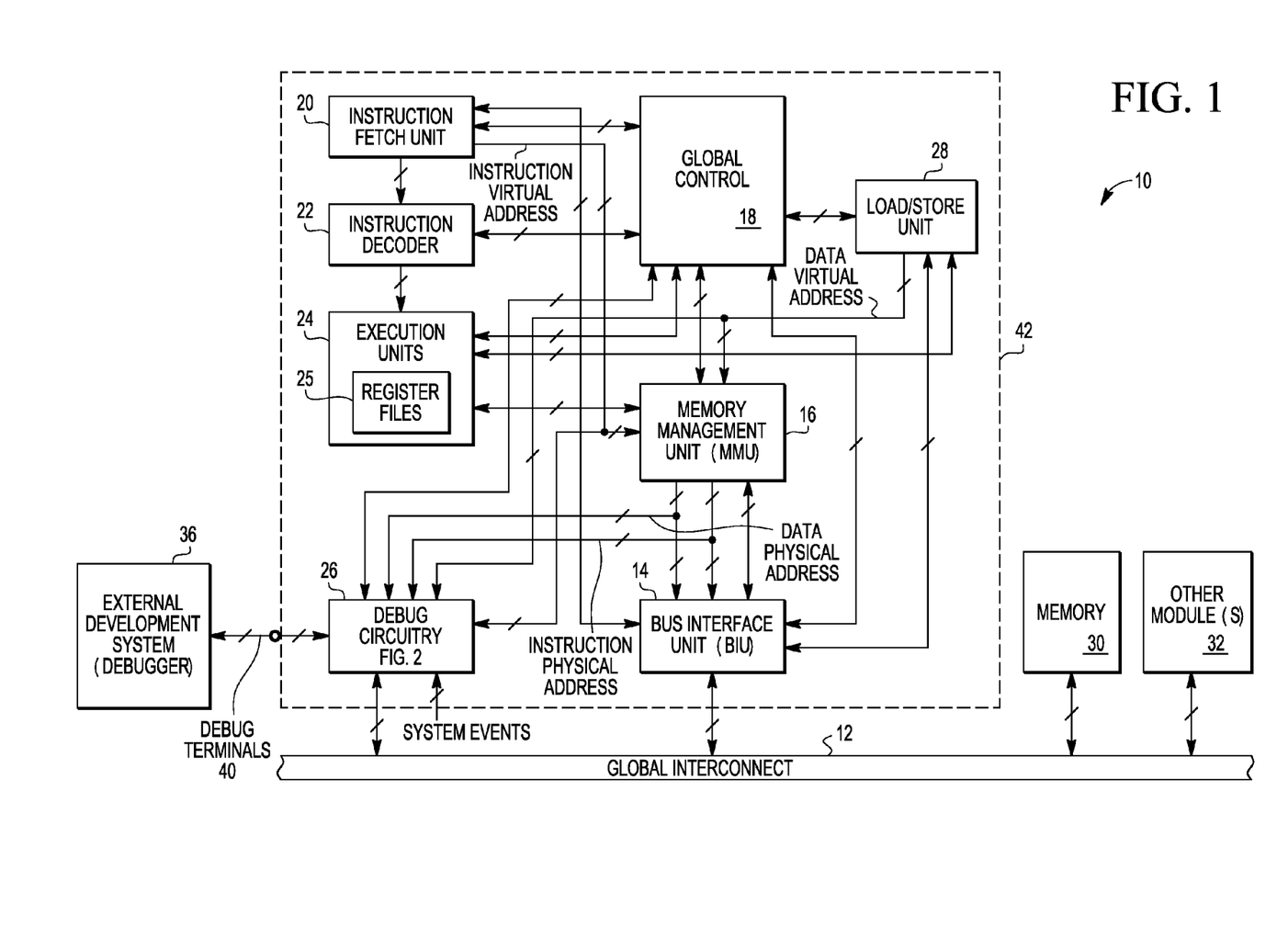
FIG. 1 illustrates in block diagram form a data processing system having debug message generation in accordance with one form of the present invention.

Illustrated in FIG. 1 is a data processing system 10 that generates debug messages. Within data processing system 10 is a global interconnect 12. In one form global interconnect 12 is a system bus. Other forms of interconnect may be used including, for example, crossbars, point-to-point connections, and optical and wireless transmission techniques. A bus interface unit (BIU) 14 is coupled to global interconnect 12 via a bidirectional coupling. In one form the bidirectional coupling is a bidirectional multiple conductor bus wherein multiple conductor buses herein are represented with a slash across the conductor. BIU 14 is bidirectionally coupled to memory management unit (MMU) 16. MMU 16 is coupled to a first input/output terminal of a global control circuit 18 via a bidirectional multiple conductor bus. A second input/output terminal of global control circuit 18 is coupled to a first input/output terminal of an instruction fetch unit 20 via a bidirectional multiple conductor bus. Instruction fetch unit 20 has an output coupled to an input of an instruction decoder 22 via a multiple conductor bus. An output of instruction decoder 22 is coupled to an input of execution units 24. In one form execution units 24 include at least one arithmetic logic unit, at least one floating point unit and at least one multiplier circuit. Within the execution units 24 are register files 25. An input/output terminal of instruction decoder 22 is coupled to a third input/output terminal of the global control circuit 18. A first input/output terminal of execution units 24 is coupled to a fourth input/output terminal of global control circuit 18. Execution units 24 and instruction fetch unit 20 are also bidirectionally coupled to MMU 16. Debug circuitry 26 has an input/output terminal coupled to a fifth input/output terminal of global control circuit 18. A load/store unit 28 has a first input/output terminal bidirectionally coupled to a sixth input/output terminal of global control circuit 18. Load/store unit 28 has a second input/output terminal coupled to a first input/output terminal of BIU 14. Load/store unit 28 has a third input/output terminal coupled to a second input/output terminal of execution units 24. A second input/output terminal of BIU 14 is coupled to a seventh input/output terminal of global control circuit 18. An output of load/store unit 28 provides a data virtual address and is coupled to a first input of MMU 16 and a first input of debug circuitry 26. An output of instruction fetch unit 20 provides an instruction virtual address and is coupled to a second input of MMU 16 and a second input of debug circuitry 26. A first output of MMU 16 provides a data physical address and is coupled to a first input of BIU 14 and to a third input of debug circuitry 26. A second output of MMU 16 provides an instruction physical address and is coupled to a second input of BIU 14 and to a fourth input of debug circuitry 26. A fifth input of debug circuitry 26 is coupled to receive system events or indications of system events from anywhere within system 10.

A memory 30 is coupled to global interconnect 12 via a bidirectional coupling. Debug circuitry 26 has a second input/output terminal coupled to a plurality of debug terminals 40 via bidirectional multiple conductors. The plurality of debug terminals 40 are coupled to an external development system 36 that is commonly referred to as a debugger or external debugger. In the illustrated form BIU 14, MMU 16, global control circuit 18, instruction fetch unit 20, instruction decoder 22, execution units 24 with register files 25, debug circuitry 26 and load/store unit 28 collectively form a data processor 42 as indicated by the dashed line grouping in FIG. 1. While global control circuit 18 is illustrated in FIG. 1 in a segregated location, it should be well understood that the circuitry and functional control of global control circuit 18 may also be implemented in a distributed manner and be included within any of the various other system blocks of data processing system 10.

Other modules 32, if any, is also coupled to global interconnect 12 via bidirectional coupling. Other modules 32 may include any type of module, such as, for example, another memory, another processor, another interconnect master, a peripheral, an input/output (I/O) device, etc. Alternatively, no other modules may be present in system 10.

In operation, data processing system 10 communicates with devices, such as memory 30 and other modules 32, via global interconnect 12. Information communicated with data processor 42 transfers through BIU 14. Instruction fetch unit 20 retrieves data processor instructions (i.e. processor instructions) from BIU 14 under control of global control circuit 18. The retrieved instructions are sequentially communicated to instruction decoder 22 for decoding under control of global control circuit 18. Execution units 24 execute instructions and generate data that is either stored in a cache (not shown) or placed in memory 30 via coupling through global control circuit 18, BIU 14, and global interconnect 12. The circuitry within processor 42 used to carry out one or more processor operations may be referred to as processor circuitry, and may include, for example, all or a portion of instruction fetch unit 20, instruction decoder 22, execution units 24, global control 18, MMU 16, load/store unit 28, and BIU 14. Operation of processor 42 is well understood in the art and will not be described in further detail herein.

Debugging of the operation of data processor 42 and data processing system 10 is performed by the use of debug circuitry 26 that generates debug messages for analysis by external development system 36. A test or debug mode of operation is entered in response to activation of such from external development system 36. In the illustrated form, debug circuitry 26 is configured to receive data addresses and instruction addresses, where the addresses may be virtual addresses or physical addresses. A data address is an address where data resides whereas an instruction address is an address where an instruction resides. Instruction virtual addresses are provided from instruction fetch unit 20 to the debug circuitry 26 and MMU 16. A virtual address is an untranslated address which requires some further processing or translating to obtain the translated address of the physical storage location where the information is residing. This translated address is referred to as the physical address. MMU 16 provides instruction physical addresses to BIU 14 and debug circuitry 26. In one form, the virtual or untranslated addresses may be logical addresses. In another form the untranslated addresses may be effective addresses. Effective addresses are first translated into virtual addresses before being translated into physical addresses. Load/store unit 28 provides data virtual addresses to debug circuitry 26 and to MMU 16. MMU 16 provides data physical addresses to BIU 14 and debug circuitry 26.

Debug circuitry 26 then forms a debug message for external development system 36 using at least a portion of one or more of the received addresses, as will be discussed in more detail below. The format of debug messages may vary and examples will be discussed below in connection with FIGS. 3-10.

Debug circuitry 26 may also determine when enabled watchpoints occur which may trigger a debug event. Also, debug circuitry 26 may receive indication from global control 18 as to when particular watchpoint events occur. Therefore, in response to a watchpoint hit (an enabled watchpoint occurring in processor 42), a debug event may be triggered causing debug circuitry 26 to perform an appropriate debug operation. Debug circuitry 26 may also receive indication of system events from elsewhere within system 10, external to processor 42. These system events can also be indicated via an external pin or signal to system 10 and to processor 42. In one embodiment, these system events may include counter overruns (e.g. overrun of a predetermined system counter, such as in global control 18), or indication of a watchpoint hit from another processor (such as another processor which may be within other modules 32). System events may also include particular inputs from external integrated circuit pins or particular signals from debugger 36.

Figure 2:
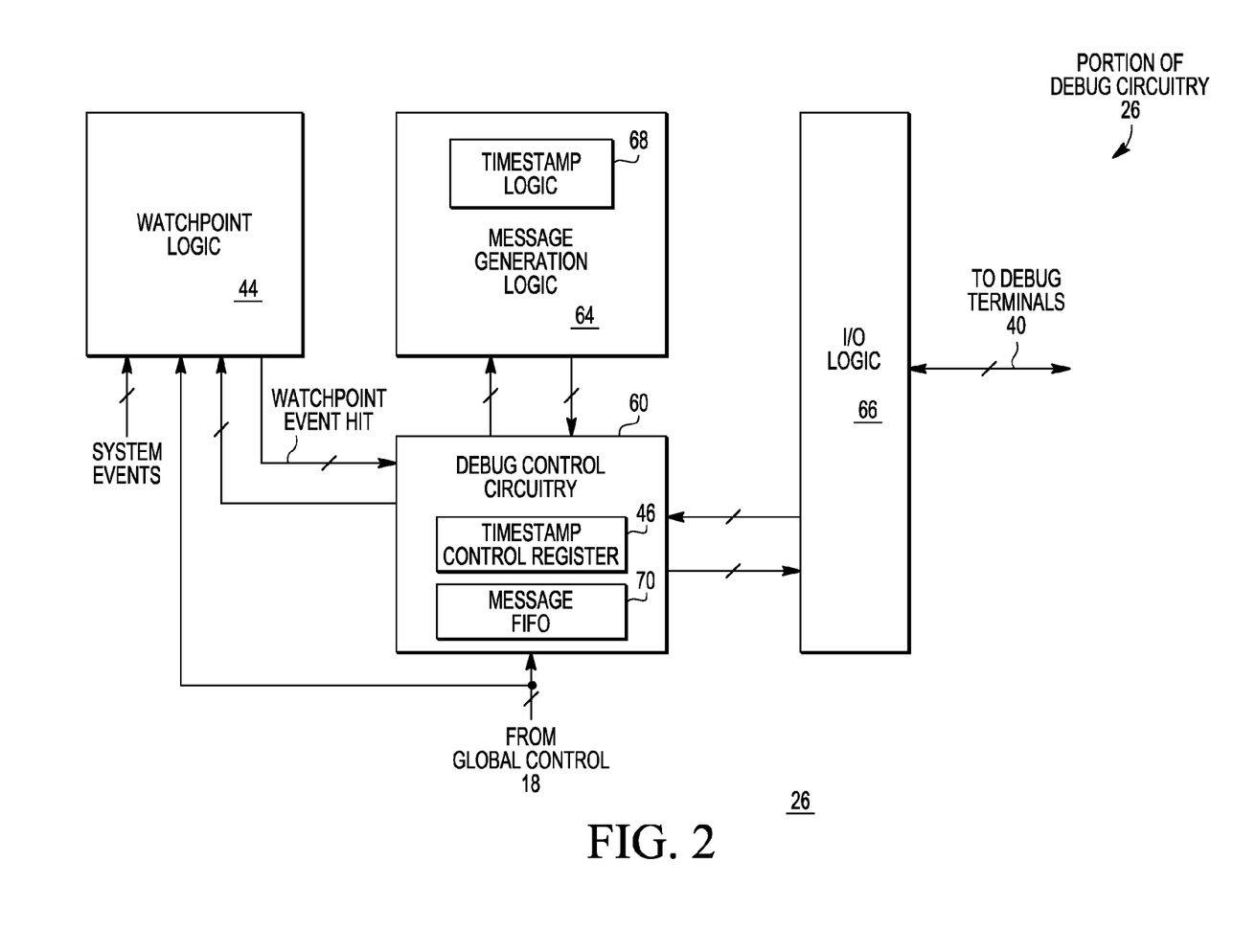
FIG. 2 illustrates in block diagram form one form of debug circuitry of FIG. 1.

Illustrated in FIG. 2 in an exemplary embodiment of a portion of debug circuitry 26 of FIG. 1. Debug circuitry 26 includes debug control circuitry 60, message generation logic 64, watchpoint logic 44, and input/output (I/O) logic 66. Message generation logic 64 includes timestamp logic 68. Debug control circuitry 60 includes a message first-in first-out storage circuit (FIFO) 70 and a timestamp control register 46, and is bidirectionally coupled to message generation logic 64, watchpoint logic 44, and I/O logic 66. Watchpoint logic 44 and debug control circuitry 60 also receive information from global control circuit 18. Watchpoint logic 44 also receives the system event indicators and provides one or more watchpoint event hit signals to debug control circuitry. I/O logic 66 is bidirectionally coupled to debug terminals 40.

In operation, message generation logic 64 is the logic circuitry which implements the function of forming debug messages pursuant to a selected one of a plurality of predetermined formats. Message generation logic 64 forms the debug messages based on activity within processor 42 or received from system 10, where timestamp logic 68 may generate a timestamp for each debug message indicating when the debug message is generated. These debug messages are then provided to debug control circuitry 60 where the timestamp is selectively appended to the debug message and the debug messages are stored in message FIFO 70. From message FIFO 70, the debug messages are routed to debug terminals 40 via I/O logic 66.

In one embodiment, external development system 36 is able to configure debug circuitry 26 to generate different types of debug messages based on different events which may occur within processor 42. Examples of these situations which result in generation of a debug message will be provided below with respect to FIGS. 3-10. Based on timestamp control register 46, which will be described in more detail below, timestamping for particular types of debug messages can be separately enabled or disabled. Therefore, based on the type of debug message generated, debug control circuitry 60 will append a timestamp to the debug message if enabled by timestamp control register 46 or not append the timestamp if not enabled by timestamp control register 46.

In one embodiment, watchpoint logic 44 determines when a watchpoint event has occurred within processor 42. When a watchpoint event occurs, watchpoint logic 44 provides a watchpoint event hit to debug control circuitry 60 indicating which watchpoint event occurred. For example, within watchpoint logic 44, a watchpoint control register may be used to enable or disable each of a plurality of different types of watchpoints. When a watchpoint event occurs which corresponds to an enabled type of watchpoint, watchpoint logic 44 asserts the watchpoint event hit to indicate the occurrence of the watchpoint and to indicate which type of watchpoint occurred. (For example, the watchpoint even hit signal can include any number of bits as needed to communicate the occurrence of the enabled watchpoint and to indicate the type which occurred.) Also, watchpoint logic 44 may receive indication from global control 18 that a particular type of watchpoint has occurred, and can then provide this information, via the watchpoint even hit signal, to debug control circuitry 60. The defining and setting up of watchpoints and the operation of determining watchpoint hits is well understood in the art and will not be described in further detail herein. Watchpoint logic 44 may also receive indication of system events and, through the use of the watchpoint event hit signal, notification of such system events can be provided to debug control circuitry 60. In one embodiment, debug control circuitry 60 may further use the information provided by the watchpoint event hit signal to qualify when timestamping should be performed. For example, in one embodiment, the use of timestamp control register 46 to control the selective appending of a timestamp to a debug message occurs during a window between two predetermined watchpoints, where a first watchpoint event hit may define a start point for that window and a second watchpoint event hit may define a stop point for that window. That is, debug control circuitry 60 may include enable logic which may enable or disable use of timestamp control register 46 based on one or more selected events in processor 42 or system 10. Further details will be provided with respect to FIGS. 11 and 12 below.

Figure 3:
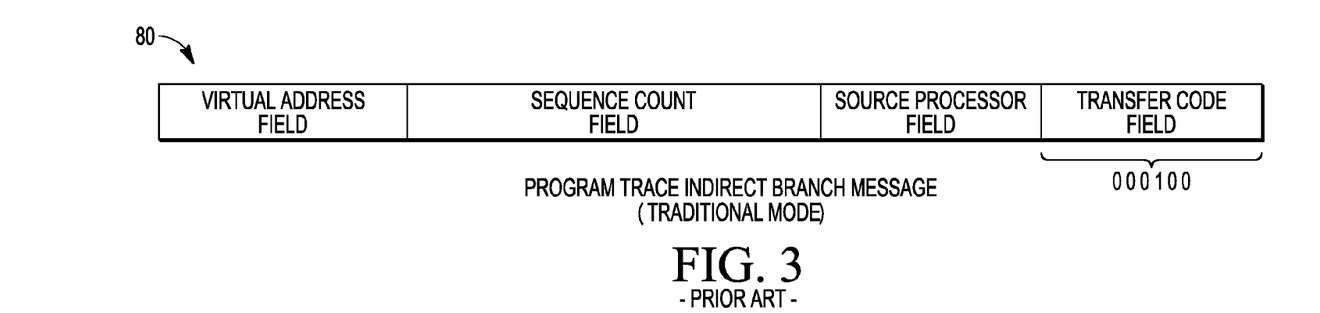
FIG. 3 illustrates in diagram form an exemplary program trace message in traditional mode in accordance with the prior art.
Figure 4:
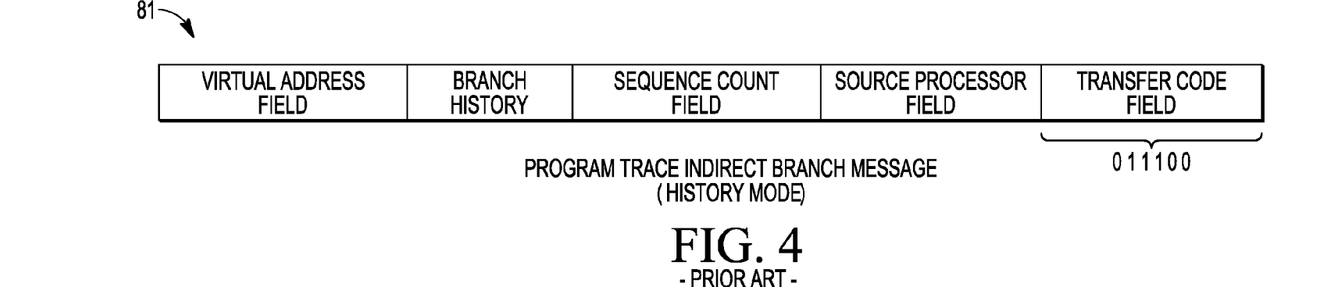
FIG. 4 illustrates in diagram form an exemplary program trace message in history mode in accordance with the prior art.
Figure 5:
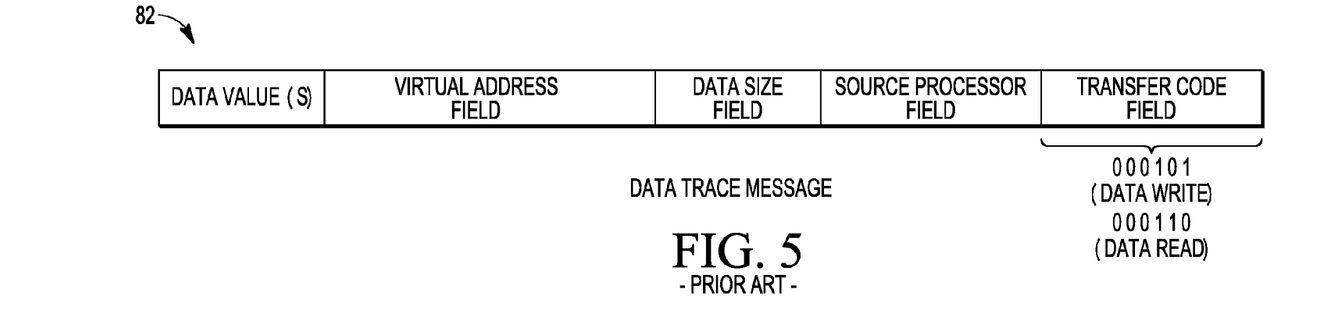
FIG. 5 illustrates in diagram form an exemplary data trace message in accordance with the prior art.
Figure 6:
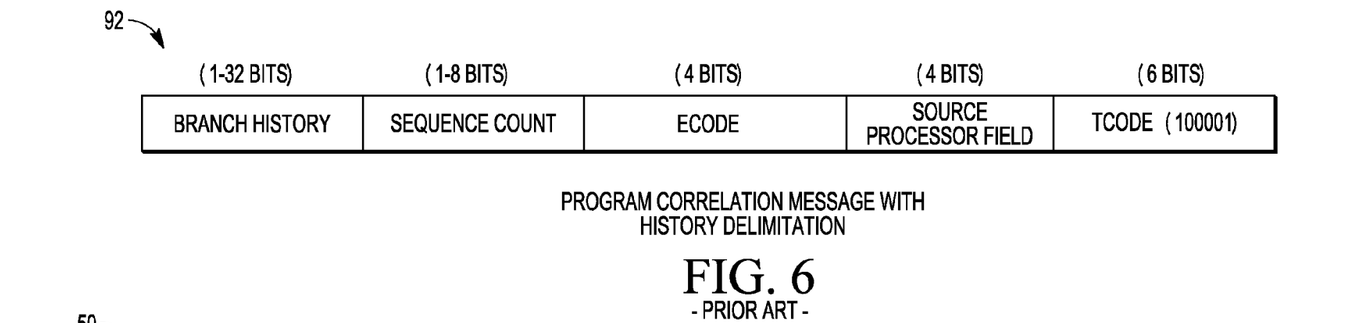
FIG. 6 illustrates in diagram form an exemplary program correlation trace message with history delimitation in accordance with one embodiment of the present invention.

Illustrated in FIGS. 3-6 are debug messages which are generated by currently available debug logic. Illustrated in FIG. 3 is a program trace indirect branch message 80 in traditional mode. Illustrated in FIG. 4 is a program trace indirect branch message 81 in history mode. Program trace indirect branch messages are generated when instructions executing on processor 42 perform an indirect branch. An indirect branch is a branch whose target address is not directly provided in the branch instruction, but instead is stored in another location, such as a register, or needs to otherwise be dynamically calculated or determined (such as for subroutine calls), or corresponds to an exception vectoring operation. A direct branch is a branch whose target is directly provided with the instruction, such as with a label corresponding to a particular address location or provided by an offset value in the instruction, and thus is typically a static value that can be determined by the debugger based on knowledge of the program instruction values. Illustrated in FIG. 5 is a data trace message 82. Illustrated in FIG. 6 is a program correlation message with history delimitation 92.

Referring to FIG. 3, trace message 80 may be generated upon execution of an indirect branch. Trace message 80 has four illustrated fields. A virtual address field contains the virtual address of trace message 80, corresponding to the target of the indirect branch. A sequence count field contains a value that represents a number of instructions that has been executed since the last program trace message. A source processor field contains a value that identifies what processor that the trace message 80 is associated with. This field information is valuable in multiple processor systems. A transfer code field contains a value that identifies trace message 80 as a program trace indirect branch message having a particular predetermined field format. In the example of FIG. 3, the value that represents a program trace message with the illustrated form is "000100," indicating the program trace indirect branch message was generated using traditional branch trace mode operation.

Referring to FIG. 4, trace message 81 may be also be generated upon execution of an indirect branch. Trace message 81 has five illustrated fields. A virtual address field contains the virtual address of trace message 81, corresponding to the target of the indirect branch. A branch history field contains a plurality of 1-bit values, where, for each direct branch executed since the last program trace message, a corresponding 1-bit value is set or cleared to indicate whether the direct branch was taken or not taken. A sequence count field contains a value that represents a number of instructions that has been executed since the last program trace message. A source processor field contains a value that identifies what processor that the trace message 80 is associated with. This field information is valuable in multiple processor systems. A transfer code field contains a value that identifies trace message 80 as a program trace indirect branch message having a particular predetermined field format. In the example of FIG. 4, the value that represents a program trace message with the illustrated form is "011100," indicating the program trace indirect branch message was generated using history mode branch trace operation.

Referring to FIG. 5, trace message 82 may be generated when a load or store instruction results in a data address value which matches a particular value. Trace message 82 has five illustrated fields. A data value(s) field contains one or more data values associated with trace message 82. A virtual address field contains the virtual address of the trace message 82. A data size field contains a value that represents the length of the data or the number of bits contained in a data word. A source processor field contains a value that identifies what processor that the trace message 82 is associated with. This field information is valuable in multiple processor systems. A transfer code field contains a value that identifies the trace message 80 as a data trace message having a particular predetermined field format. In the example of FIG. 5, the value that represents a data write trace message with the illustrated form is "000101". The value that represents a data read trace message with the illustrated form is "000110".

Another type of debug message in use today is a program correlation message which may be used to correlate debug messages, such as in the case when a change in memory mapping occurs. For example, as discussed above in reference to FIG. 4, the branch history field is useful in order to provide a better view of the address translations used for specific taken branches (e.g. for direct branches) which do not generate program trace messages. However, when a change in virtual memory mapping occurs between those executed branches (e.g. indirect branches) which do generate program trace messages, the branch history field no longer provides accurate information beyond the point at which the change in mapping occurred. Therefore, a program correlation message may be generated which includes the branch history information up to the point of the change in virtual address mapping. Program correlation messages, when properly ordered with respect to other trace messages, may allow a debugger, such as external development system 36, to perform program trace reconstruction in the context of the mappings in place at the time the branch history was accumulated. In this manner, the program correlation message can properly provide the branch history information and instruction count information (i.e. sequence count information) for instructions executed since the last program trace message was generated up to the point that a change in mapping occurs.

FIG. 6 illustrates a program correlation message 92 with branch history delimitation which may be generated and properly ordered with respect to a debug trace message. Program correlation message 92 has five illustrated fields. The positioning of the fields is arbitrary. A branch history field contains a plurality of 1-bit values, where, for each direct branch taken since the last program trace message, a corresponding 1-bit value is set or cleared to indicate whether the direct branch was taken or not taken. This branch history field contains this information for each direct branch taken up to the point at which the memory mapping is changed. A sequence count field (also referred to as an instruction count field) contains a value that represents a number of instructions that has been executed since the last program trace message up to the point at which the memory mapping is changed. A source processor field contains a value that identifies what processor that the program correlation message 92 is associated with. This field information is valuable in multiple processor systems. A transfer code field contains a value that identifies program correlation message 92 as a program correlation message with history delimitation of a predetermined field format. In the example of FIG. 6, the value that represents a program trace message with the illustrated form is "100001". An event code (ECODE) field contains a value that further identifies the predetermined field format of program correlation message 92. That is, it may be used to further distinguish between different types of program correlation trace messages.

Figure 7:
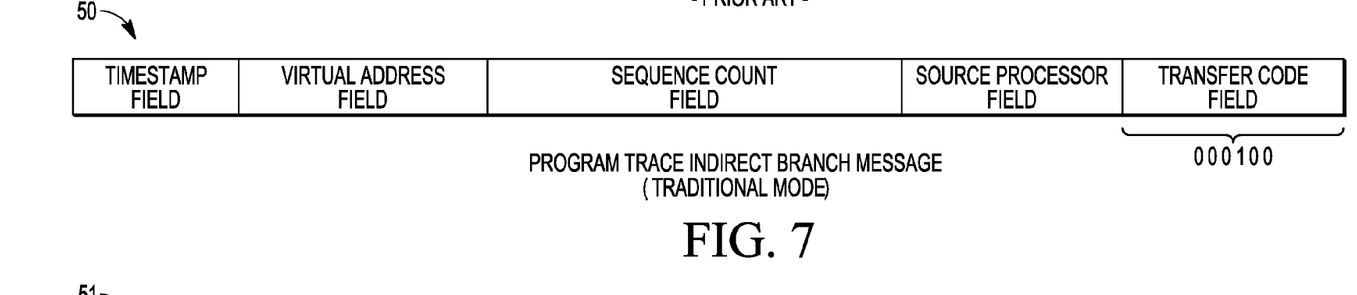
FIG. 7 illustrates in diagram form an exemplary program trace message in traditional mode having a timestamp field generated in accordance with one embodiment of the present invention.
Figure 8:
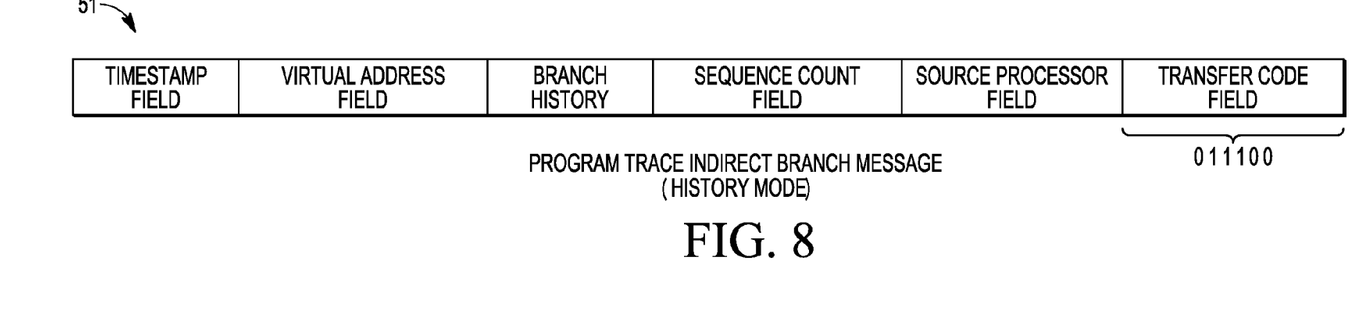
FIG. 8 illustrates in diagram form an exemplary program trace message in history mode having a timestamp field generated in accordance with one embodiment of the present invention.
Figure 9:
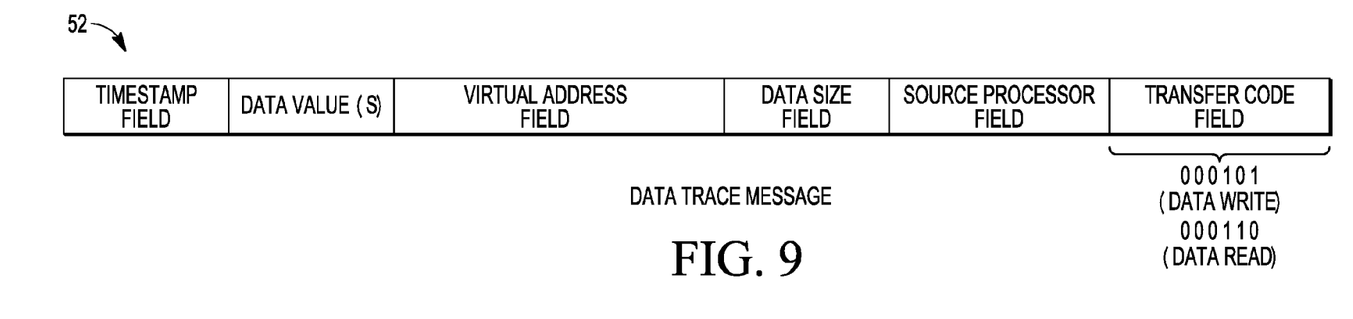
FIG. 9 illustrates in diagram form an exemplary data trace message having a timestamp field generated in accordance with one embodiment of the present invention.
Figure 10:
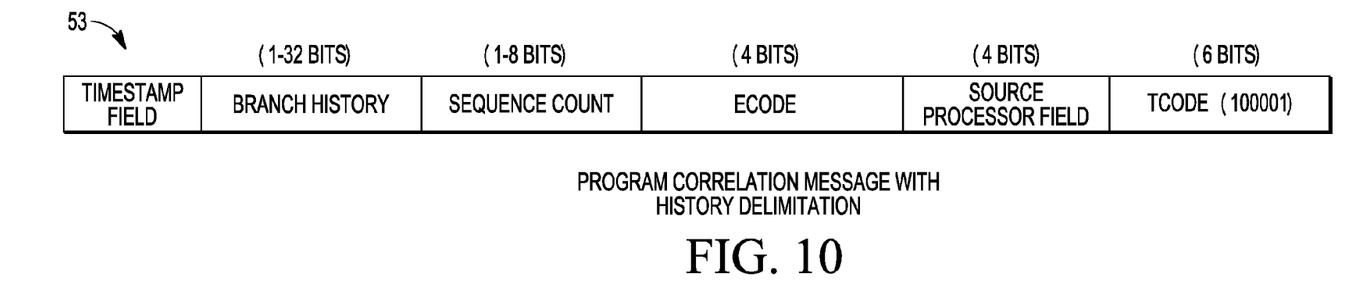
FIG. 10 illustrates in diagram form an exemplary program correlation trace message with history delimitation having a timestamp field generated in accordance with one embodiment of the present invention.

Illustrated in FIGS. 7-10 are debug messages which may be generated by debug circuitry 26 in accordance with embodiments of the present invention. Illustrated in FIG. 7 is a program trace indirect branch message 50 in traditional mode having an appended timestamp. Illustrated in FIG. 8 is a program trace indirect branch message 51 in history mode having an appended timestamp. Illustrated in FIG. 9 is a data trace message 52 having an appended timestamp. Illustrated in FIG. 10 is a program correlation message 53 with history delimitation having an appended timestamp. The descriptions provided above with respect to debug messages 80, 81, 82, and 92, apply to debug messages 50-53, respectively. However, each of debug messages 50-53 further includes an appended timestamp field (not present in debug messages 80, 81, 82, and 92) which includes a timestamp of when the corresponding debug message was generated. The timestamp fields are appended to these debug messages by debug control circuitry 60 in accordance with timestamp control register 46.

Figure 11:
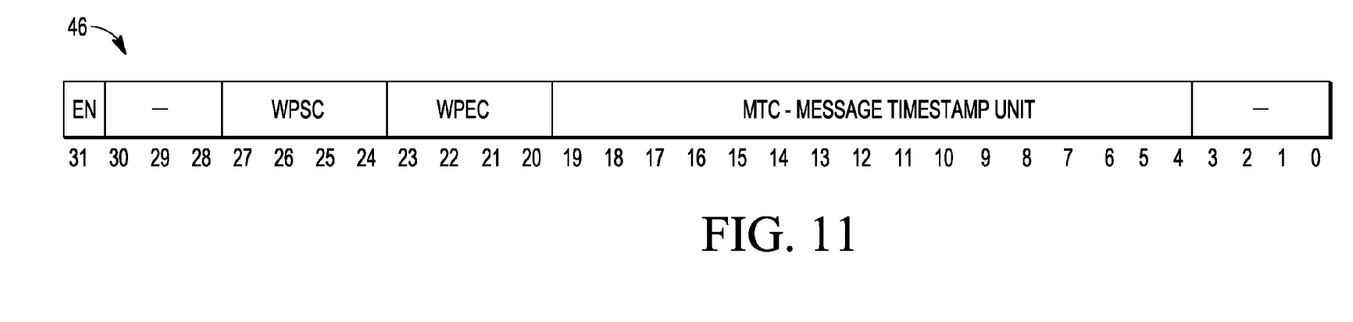
FIG. 11 illustrates in diagram form an exemplary timestamp control register in accordance with one embodiment of the present invention.

FIG. 11 illustrates an example of timestamp control register 46 of FIG. 2. Timestamp control register 46 includes an enable (EN) field, a watchpoint source start control (WPSC) field, a watchpoint source end control (WPEC) field, and a message timestamp control (MTC) field. Note that in alternate embodiments, one or more registers may be used to store this information and the information may be organized in a variety of different formats, where additional fields may be used and where each field may have more or fewer bits, as needed. Description of these fields is provided in the table of FIG. 12.

Figure 12:
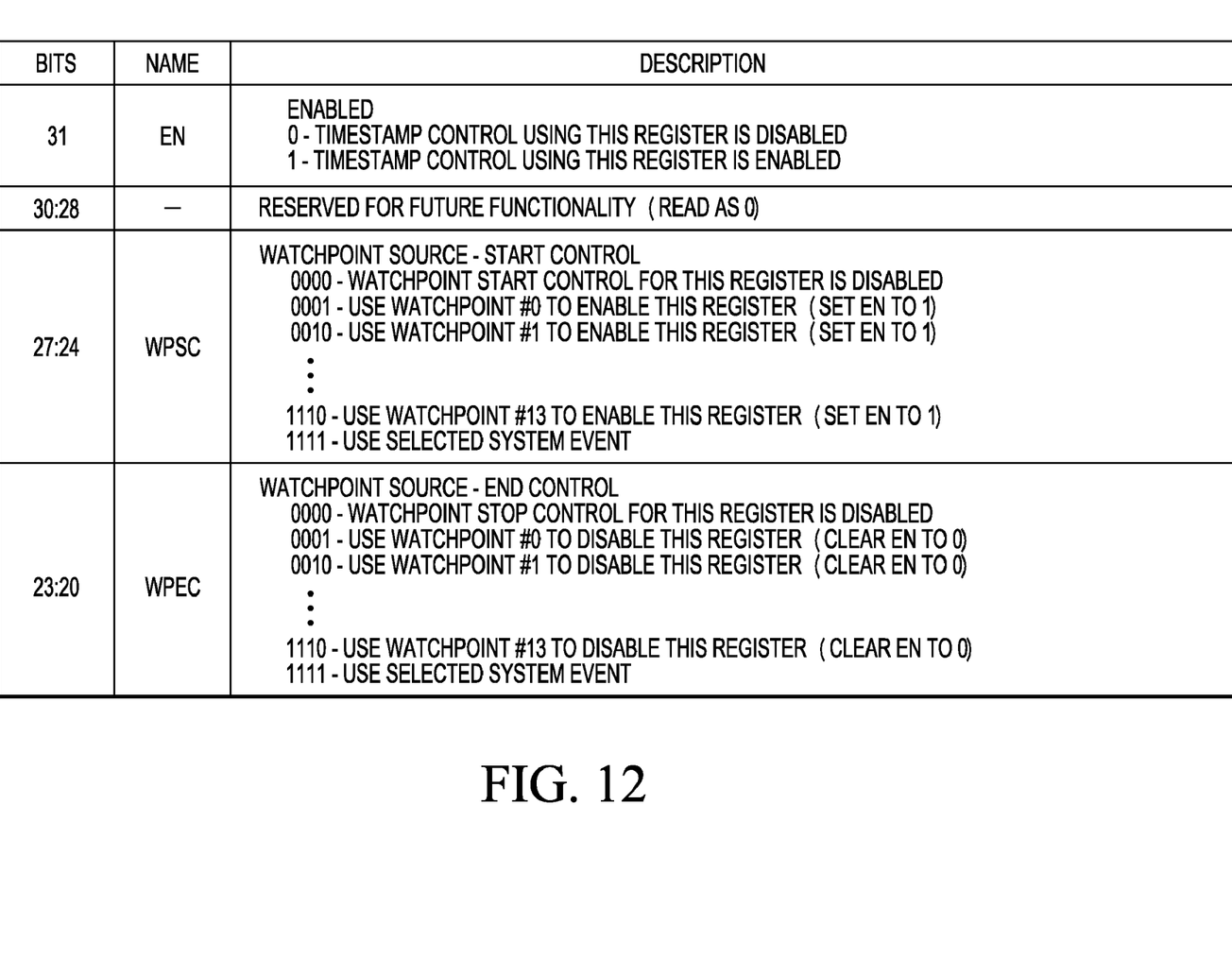
FIGS. 12 and 13 illustrate in table form a description of various fields of the timestamp control register of FIG. 11, in accordance with one embodiment of the present invention.
Figure 13:
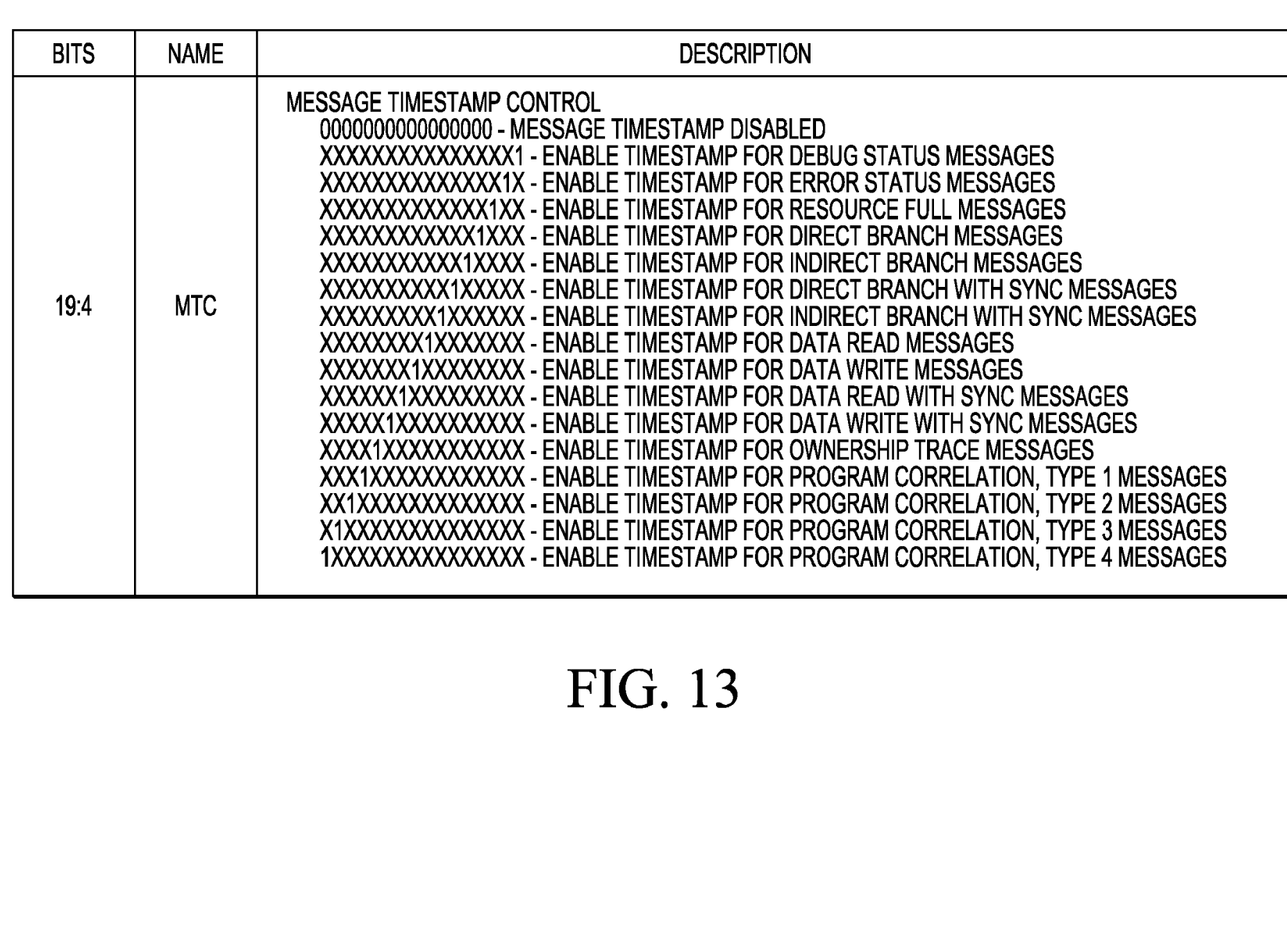

FIGS. 12 and 13 illustrate a table which describes the fields of timestamp control register 46 in accordance with one embodiment of the present invention. As illustrated FIG. 12, the EN field is a one-bit field which, when asserted (e.g. equal to logic level 1), indicates that timestamp register 46 is enabled and when negated (e.g. equal to logic level 0), indicates that timestamp register 46 is disabled. When timestamp register 46 is enabled, debug control circuitry 60 uses the information stored within timestamp register 46 to selectively append a timestamp to the generated debug messages for storage into message FIFO 70. However, when timestamp register 46 is not enabled, debug control circuitry 60 does not use any information within register 46 to selectively append a timestamp. In one embodiment, when timestamp control register 46 is disabled, no timestamps are appended to debug messages. In one embodiment, software executing on processor 42 may be used to write to the EN field.

As illustrated in FIG. 13, the MTC field includes one bit for each of a plurality of types of debug messages to indicate whether or not timestamping is enabled for that particular type of debug message. For example, some of those debug message types were described above in reference to FIGS. 3-6. However, additional types of debug messages can be generated by message generation logic 64. Therefore, some debug message types for which timestamping can be individually enabled or disabled includes debug status messages, error status messages, resource full messages, direct branch messages, indirect branch messages, direct branch with synchronization messages, indirect branch with synchronization messages, data read messages, data write messages, data read with synchronization messages, data write with synchronization messages, ownership trace messages, and different types of program correlation messages (such as types 1-4). Each of these types of messages has a corresponding (enable bit (i.e. a correlated control bit) within the MTC field, which, when asserted (e.g. equal to logic level 1), indicates that timestamping is enabled for that type of message and when negated (e.g. equal to logic level 0), indicates that timestamping is not enabled for that type of message. For example, according to the example of FIG. 12, when the $8^{th}$ and $12^{th}$ bits of the MTC field from left to right are asserted, timestamps are appended to both data write messages and indirect branch messages by debug control circuitry 46. Therefore, note that any number of bits in the MTC field can be asserted to enable timestamping for any subset of the message types. In one embodiment, when the MTC field has a value of all 0's, timestamping is disabled for all message types.

Also, in one embodiment, whether timestamping is enabled for a particular message type also depends on the WPSC and WPEC fields, which are illustrated in FIG. 12. For example, these fields may define a window of time during which the MTC field is used to selectively append timestamp information to messages. That is, in one embodiment, timestamping according to the MTC field is only enabled upon receiving an indication, via the watchpoint event hit signal, that the particular watchpoint indicated in the WPSC field has occurred. Similarly, timestamping according to the MTC field is disabled upon receiving indication, via the watchpoint event hit signal, that the particular watchpoint indicated by the WPEC field has occurred. For example, each of the WPSC and WPEC fields may be a 4-bit field which can indicate one of 13 different watchpoints. Also, a value of 0000 can indicate that the corresponding WPSC or WPEC field is disabled. Also, a value of 1111 can indicate that a selected system event can define the start or stop of the window of time during which the MTC field is used to selectively append timestamp information. In one embodiment, the system events are received by watchpoint logic 44 which can provide information as to their occurrence and type to debug control circuitry 60 via the watchpoint even hit signal. Also, additional logic may be present in debug circuitry 26 which defines different types of system events. Also, in one embodiment, when the MTC field is enabled based on the WPEC field, the EN field is asserted (e.g. set to its active state), and when the MTC field is disabled based on the WPSC field, the EN field is negated (e.g. set to its non-active state).

In alternate embodiments, the WPSC and WPEC fields may be used to define multiple watchpoint occurrences, a set of watchpoint occurrences, a sequence of watchpoint occurrences, or a logical combination of watchpoint occurrences which start or stop the window of time (i.e. which enable or disable use of the MTC field). Similarly, the WPSC and WPEC fields may be used to define multiple system event occurrences, a set of system event occurrences, a sequence of system event occurrences, or a logical combination of system occurrences which start or stop the window of time (i.e. which enable or disable use of the MTC field). Note that in alternate embodiments, the EN field may not be present or the WPSC and WPEC fields may not present, such that use of the MTC field (of timestamp control register 46) is always used to indicate when timestamps should be appended.

In one embodiment, software executing on processor 42 may be used to write to the fields of timestamp control register 46 (such as the EN, WPSC, and WPEC fields). In one embodiment, the EN field is asserted based on the WPSC and WPEC fields such that the EN field is asserted during the window of time defined by the WPSC and WPEC fields when selective timestamping according to the MTC field is enabled. In one embodiment, the EN field is asserted in response to a system event. In one embodiment, the EN field may be set by software to start the beginning of a window of time, and a subsequent watchpoint or system event selected by the WPEC field is used to end the window. In one embodiment, the occurrence of a watchpoint or system event selected by the WPSC field is used to start a window of time during which timestamping is enabled, and the EN field may be cleared by software to end the window of time. In an alternate embodiment, multiple MTC registers may be present, and each may independently enable timestamping. By utilizing this arrangement, multiple windows of time during which timestamping is enabled may be implemented, each with the capability of selecting a unique set of debug messages to be timestamped. For some embodiments, the timestamping of certain message types may be performed continuously, while other message types may only be timestamped when certain processor or system events occur, to allow the debugger to focus in to a window in which a particular problem is occurring.

Therefore, by now it should be understood how timestamp control information may be used to selectively append timestamp information to debug messages. For example, the timestamp control information may enable timestamping for certain types or classes of debug messages. Furthermore, further control of debug message generation may be achieved through the use of watchpoint events or system events which can be used to enable or disable use of the timestamp control information (e.g. to enable or disable appending a timestamp to debug messages). Therefore, by utilizing selective control over timestamping for debug messages, bandwidth required for debug messaging may be conserved since, in many systems, limited bandwidth for externally exporting trace information is available. Also, in one embodiment, the ability to selectively append timestamps allows for the dynamic sizing of bandwidth between debug circuitry 26 and external debugger 36.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, any number of integrated circuit chips may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a data processing system having debug message generation which includes processor circuitry which performs a plurality of processor operations; global control circuitry coupled to the processor circuitry; and debug circuitry coupled to the global control circuitry for generating debug messages corresponding to predetermined processor operations. The debug circuitry includes message generation logic for providing debug messages which selectively include a timestamp field providing information as to when a debug message is generated; and debug control circuitry coupled to the global control circuitry and the message generation logic, where the debug control circuitry includes a timestamp control register. For each of a plurality of debug message types, the timestamp control register selectively enables or disables appending a timestamp to the debug message for that type of debug message. Item 2 includes the data processing system of item 1 and further includes enable logic coupled to the timestamp control register for enabling or disabling the timestamp control register based on detecting a selected event in the data processing system. Item 3 includes the data processing system of item 2 wherein the selected event comprises an occurrence of a watchpoint in the data processing system. Item 4 includes the data processing system of item 3 wherein a portion less than all and more than one of the plurality of debug message types within the timestamp control register is enabled. Item 5 includes the data processing system of item 2 wherein the debug control circuitry enables the timestamp control register upon an occurrence of a first set of one or more predetermined system events and disables the timestamp control register upon an occurrence of a second set of one or more predetermined system events. Item 6 includes the data processing system of item 5, wherein at least one of the first set of one or more predetermined system events and the second set of one or more predetermined system events comprise a set of either one or more predetermined watchpoints or a sequence of watchpoints. Item 7 includes the data processing system of item 1, wherein the timestamp control register includes an enable bit that selectively enables use of the timestamp control register, wherein the enable bit is itself enabled by being placed in an active value in response to either a value of another control field of the timestamp control register or execution by the processor circuitry of software. Item 8 includes the data processing system of item 7, wherein the value of the another control field is determined by an occurrence of a predetermined event in the data processing system, the predetermined event comprising any one of an overrun of a predetermined system counter, an input from an external integrated circuit pin, a watchpoint generated by circuitry other than the processor circuitry and a signal from a debugger coupled to the data processing system.

Item 9 includes a method which includes executing a plurality of data processing instructions; generating debug messages corresponding to predetermined processing operations; and selectively including a timestamp field providing information as to when a debug message is generated in response to a timestamp control register, where the timestamp control register enables or disables an appending of a timestamp to the debug message in response to a control bit in the timestamp control register that is correlated to a predetermined type of debug message. Item 10 includes the method of item 9 and further includes providing multiple control bits in the timestamp control register, each of the multiple control bits being correlated to a predetermined different type of debug message, wherein the timestamp control register controls the appending of a timestamp for any of a plurality of types of debug messages. Item 11 includes the method of item 10 and further includes providing an enable bit in the timestamp control register, the enable bit functioning to enable or disable the timestamp control register thereby not permitting any timestamps to be added to debug messages regardless of whether the timestamp control register indicates that a timestamp should be added to a particular type of debug message that does occur. Item 12 includes the method of item 11 and further includes providing watchpoint control fields in the timestamp control register wherein a first watchpoint control field sets the enable bit in an active state in response to any of a first set of watchpoints occurring and a second watchpoint control field sets the enable bit in a non-active or disabled state in response to any of a second set of watchpoints occurring, whereby timestamping of debug messages selectively occurs during a window between two predetermined watchpoints and only occurs for predetermined types of debug messages occurring within the window. Item 13 includes the method of item 12 and further includes setting the enable bit in response to multiple watchpoints within the first set of watchpoints occurring. Item 14 includes the method of item 12 and further includes setting the enable bit in response to a predetermined sequence of multiple watchpoints within the first set of watchpoints occurring.

Item 15 includes a data processing system having debug message generation which includes processor circuitry for executing a plurality of data processing instructions; debug message generation logic coupled to the processor circuitry for generating debug messages during operation of the processor circuitry; and debug control circuitry coupled to the debug message generation logic. The debug control circuitry selectively appends a timestamp to one or more of the debug messages under control of a timestamp control register. The timestamp control register includes a plurality of control bits, each of the plurality of control bits being correlated to one of a plurality of predetermined types of debug message, wherein the debug control circuitry will not append a timestamp to the predetermined types of debug message unless a correlated control bit within the timestamp control register is asserted. Item 16 includes the data processing system of item 15, wherein the timestamp control register further comprises an enable bit for disabling the appending of the timestamp to the predetermined type of debug message even when the correlated control bit within the timestamp control register is asserted. Item 17 includes the data processing system of item 16, wherein the enable bit is made active by a first set of one or more watchpoint events in the data processing system and is made inactive by a second set of one or more watchpoint events in the data processing system. Item 18 includes the data processing system of item 15, wherein a portion of the plurality of control bits being correlated to a predetermined type of debug message are not enabled, and wherein occurrence of debug message types having a correlated disabled control bit are not timestamped. Item 19 includes the data processing system of item 15, wherein the plurality of predetermined types of debug message further comprise at least two of status messages, resource full messages, branch trace messages, data read messages, data write messages, ownership trace messages and program correlation messages Item 20 includes the data processing system of item 15, and further includes watchpoint logic circuitry having an input for receiving system events and having an output coupled to the debug control circuitry for providing watchpoint event indicators, the debug control circuitry enabling or disabling the timestamp control register in response to the watchpoint logic circuitry providing a predetermined detected watchpoint.

What is claimed is:

1. A method, comprising:
executing a plurality of data processing instructions;
generating debug messages corresponding to predetermined processing operations; and
selectively including a timestamp field providing information as to when a debug message is generated in response to a timestamp control register, the timestamp control register enabling or disabling an appending of a timestamp to the debug message in response to a control bit in the timestamp control register that has a particular one to one correlation to a predetermined type of debug message.

2. The method of claim 1 further comprising:
providing multiple control bits in the timestamp control register, each of the multiple control bits having a particular one to one correlation to a predetermined different type of debug message, wherein the timestamp control register controls the appending of a timestamp for any of a plurality of types of debug messages.

3. The method of claim 2 further comprising:
providing an enable bit in the timestamp control register, the enable bit functioning to enable or disable the timestamp control register thereby not permitting any timestamps to be added to debug messages regardless of whether the timestamp control register indicates that a timestamp should be added to a particular type of debug message that does occur.

4. The method of claim 3 further comprising:
providing watchpoint control fields in the timestamp control register wherein a first watchpoint control field sets the enable bit in an active state in response to any of a first set of watchpoints occurring and a second watchpoint control field sets the enable bit in a non-active or disabled state in response to any of a second set of watchpoints occurring, whereby timestamping of debug messages selectively occurs during a window between two predetermined watchpoints and only occurs for predetermined types of debug messages occurring within the window.

5. The method of claim 4 further comprising:
setting the enable bit in response to multiple watchpoints within the first set of watchpoints occurring.

6. The method of claim 4 further comprising:
setting the enable bit in response to a predetermined sequence of multiple watchpoints within the first set of watchpoints occurring.

7. A data processing system having debug message generation comprising:
processor circuitry for executing a plurality of data processing instructions;
debug message generation logic coupled to the processor circuitry for generating debug messages during operation of the processor circuitry; and
debug control circuitry coupled to the debug message generation logic, the debug control circuitry selectively appending a timestamp to one or more of the debug messages under control of a timestamp control register, the timestamp control register comprising a plurality of control bits, each of the plurality of control bits having a particular one to one correlation to one of a plurality of predetermined types of debug message, wherein the debug control circuitry will not append a timestamp to the predetermined types of debug message unless a correlated control bit within the timestamp control register is asserted.

8. The data processing system of claim 7 wherein the timestamp control register further comprises an enable bit for disabling the appending of the timestamp to the predetermined type of debug message even when the correlated control bit within the timestamp control register is asserted.

9. The data processing system of claim 8 wherein the enable bit is made active by a first set of one or more watchpoint events in the data processing system and is made inactive by a second set of one or more watchpoint events in the data processing system.

10. The data processing system of claim 7 wherein a portion of the plurality of control bits being correlated to a predetermined type of debug message are not enabled, wherein occurrence of debug message types having a correlated disabled control bit are not timestamped.

11. The data processing system of claim 7 wherein the plurality of predetermined types of debug message further comprise at least two of status messages, resource full messages, branch trace messages, data read messages, data write messages, ownership trace messages and program correlation messages.

12. The data processing system of claim 7 further comprising:
watchpoint logic circuitry having an input for receiving system events and having an output coupled to the debug control circuitry for providing watchpoint event indicators, the debug control circuitry enabling or disabling the timestamp control register in response to the watchpoint logic circuitry providing a predetermined detected watchpoint.

* * * * *